INVENTORS
MYRON N. KAUFMAN
BERNARD GRAND
DOMINICK CAPUANO

Laurence S. Epstein
ATTORNEYS

INVENTORS
MYRON N. KAUFMAN
BERNARD GRAND
DOMINICK CAPUANO

Laurence S. Epstein
ATTORNEYS

INVENTORS
MYRON N. KAUFMAN
BERNARD GRAND
DOMINICK CAPUANO

Laurence S. Epstein
ATTORNEYS

INVENTORS
MYRON N. KAUFMAN
BERNARD GRAND
DOMINICK CAPUANO

Laurence S. Epstein
ATTORNEYS

INVENTORS
MYRON N. KAUFMAN
BERNARD GRAND
DOMINICK CAPUANO

Laurence S. Epstein
ATTORNEYS

INVENTORS
MYRON N. KAUFMAN
BERNARD GRAND
DOMINICK CAPUANO

Laurence S. Epstein
ATTORNEYS

INVENTORS
MYRON N. KAUFMAN
BERNARD GRAND
DOMINICK CAPUANO
BY
Laurence S. Epstein
ATTORNEYS

WAKE SIMULATOR UTILIZING DIGITAL STORAGE

INVENTORS
MYRON N. KAUFMAN
BERNARD GRAND
DOMINICK CAPUANO

BY Laurence S. Epstein
ATTORNEYS

INVENTORS
MYRON N. KAUFMAN
BERNARD GRAND
DOMINICK CAPUANO
BY
Laurence S. Epstein
ATTORNEYS

INVENTORS
MYRON N. KAUFMAN
BERNARD GRAND
DOMINICK CAPUANO

Laurence S. Epstein
ATTORNEYS

INVENTORS
MYRON N. KAUFMAN
BERNARD GRAND
DOMINICK CAPUANO

Laurence S. Epstein
ATTORNEYS

3,341,697
WAKE SIMULATOR UTILIZING DIGITAL STORAGE

Myron Norman Kaufman, Massapequa, and Bernard Grand and Dominick Capuano, Plainview, N.Y., assignors, by direct and mesne assignments, to the United States of America as represented by the Secretary of the Navy Filed Feb. 28, 1964, Ser. No. 348,924
9 Claims. (Cl. 235—184)

The instant invention relates to simulator devices and is particularly directed towards a device for simulating the wake of ships using digital storage and arithmetic techniques.

The wakes of ships are simultaneously a problem and an aid to operators of active sonar devices. A wake acts as a reflecting surface which returns echoes to pinging sonars. Distinguishing a wake echo from a target or hard object echo is of value to the sonar operator since such recognition will prevent misinterpretation of sonar displays and at the same time allow the sonar operator to follow the wake to its source. Reflecting properties of a wake are not perfect. A portion of the sonar sound energy passes through the wake, consequently, objects (other targets as well as other wakes) beyond the wake are not totally eclipsed and return echoes of their own. The echoes received from objects in the wakes' shadows are reduced by the reflected energy through the forward wake as well as the energy absorbed in passing through the forward wakes.

It is therefore an object of the instant invention to provide a novel system for simulating ships' wakes on sonar receiving equipment.

A further object of the instant invention is to provide a novel apparatus for realistic simulation of ships' wakes using digital storage.

Another object of the instant invention is to provide a novel wake simulator for realistic simulation of a wake over a long period of time.

Yet another object of the instant invention is to provide a novel wake simulator for realistic simulation of wake echoes for scanning types of sonar equipment mounted on moving vessels.

Other objects and many of the attendant advantages of this invention will be readily appreciated as the same becomes better understood by reference to the following detailed description when considered in connection with the accompanying drawings wherein:

FIGS. 1*a*–1*f* is a system block diagram for the wake simulator system for scanning non-stationary sonar;

Figure 1A:
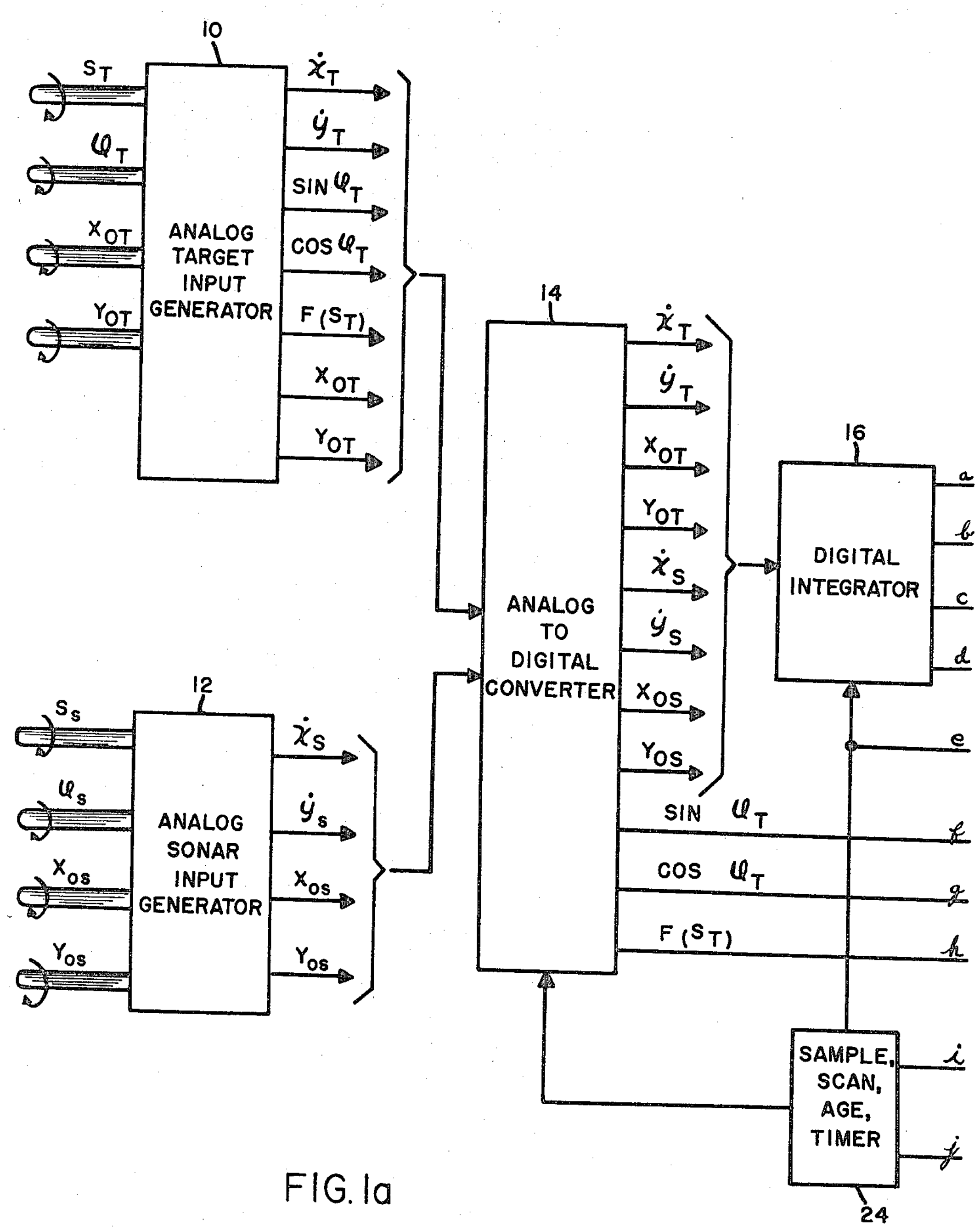
Figure 1B:
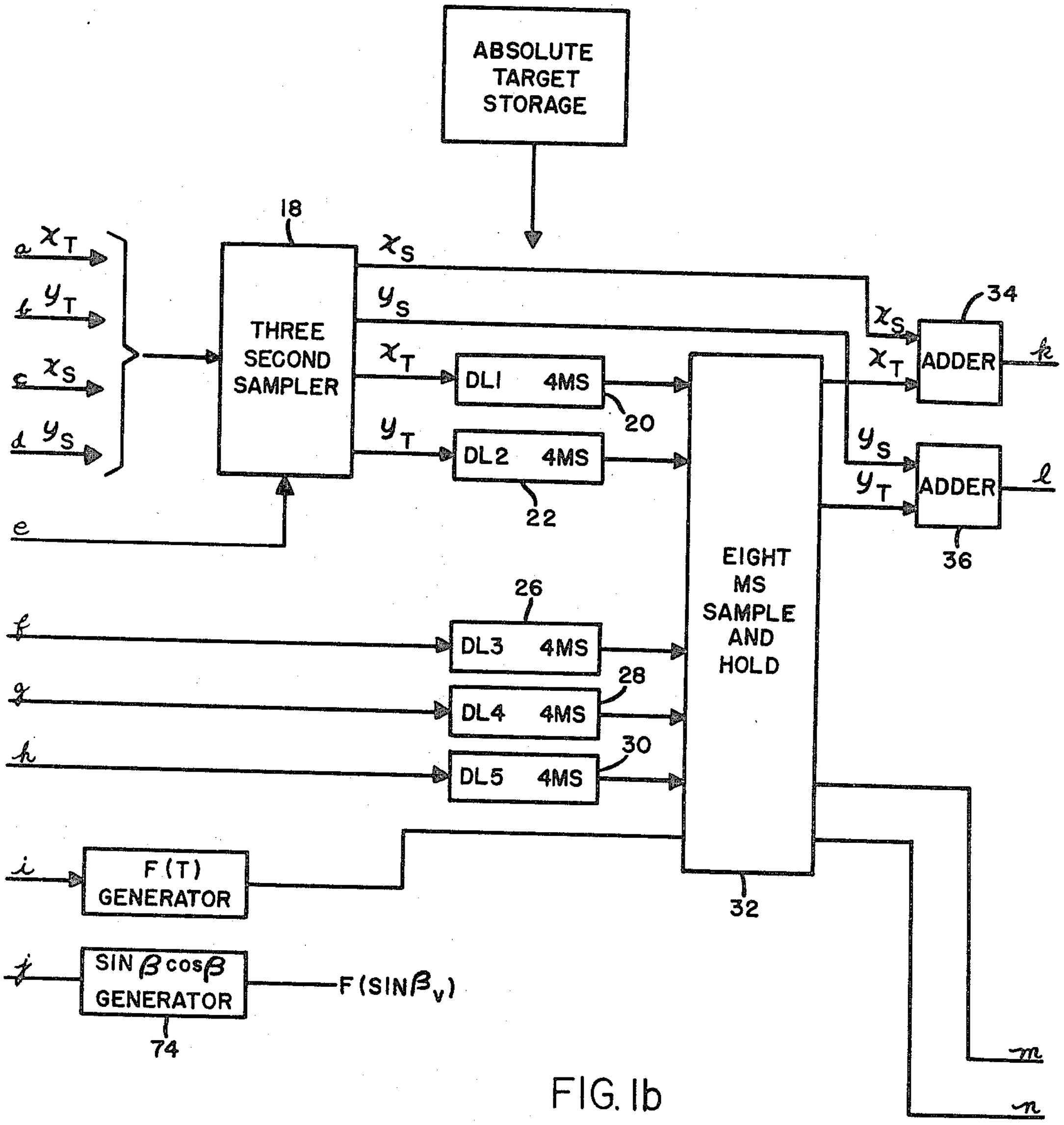
Figure 1C:
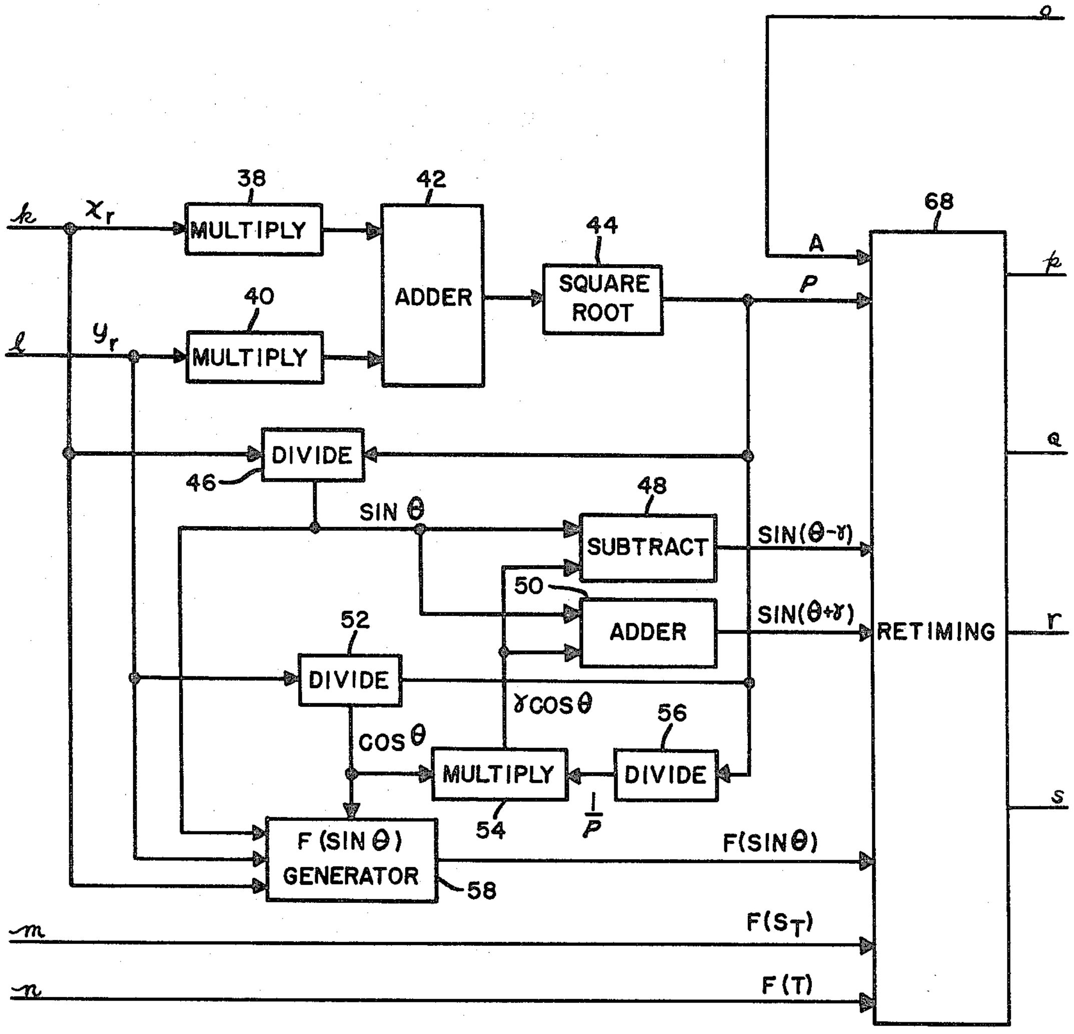
Figure 1D:
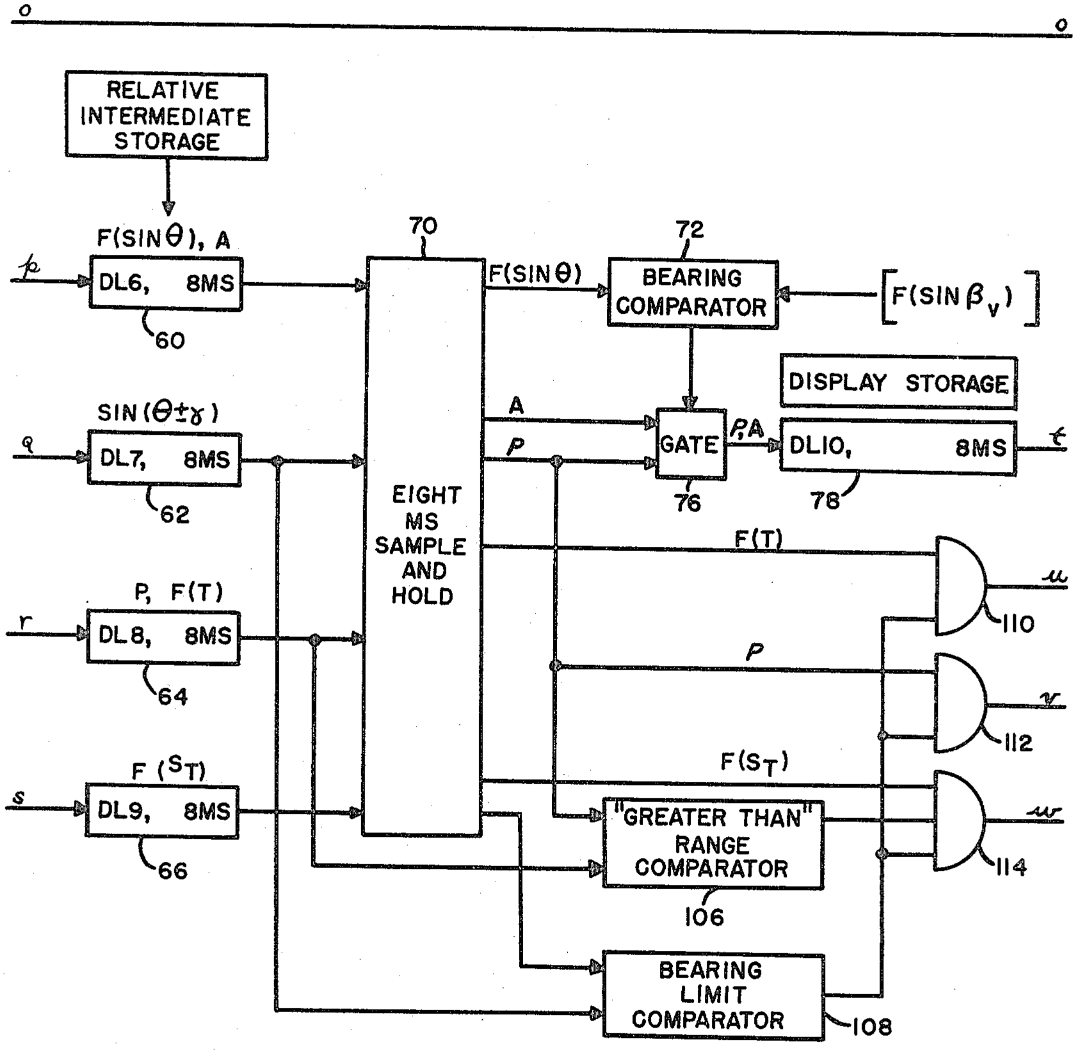
Figure 1E:
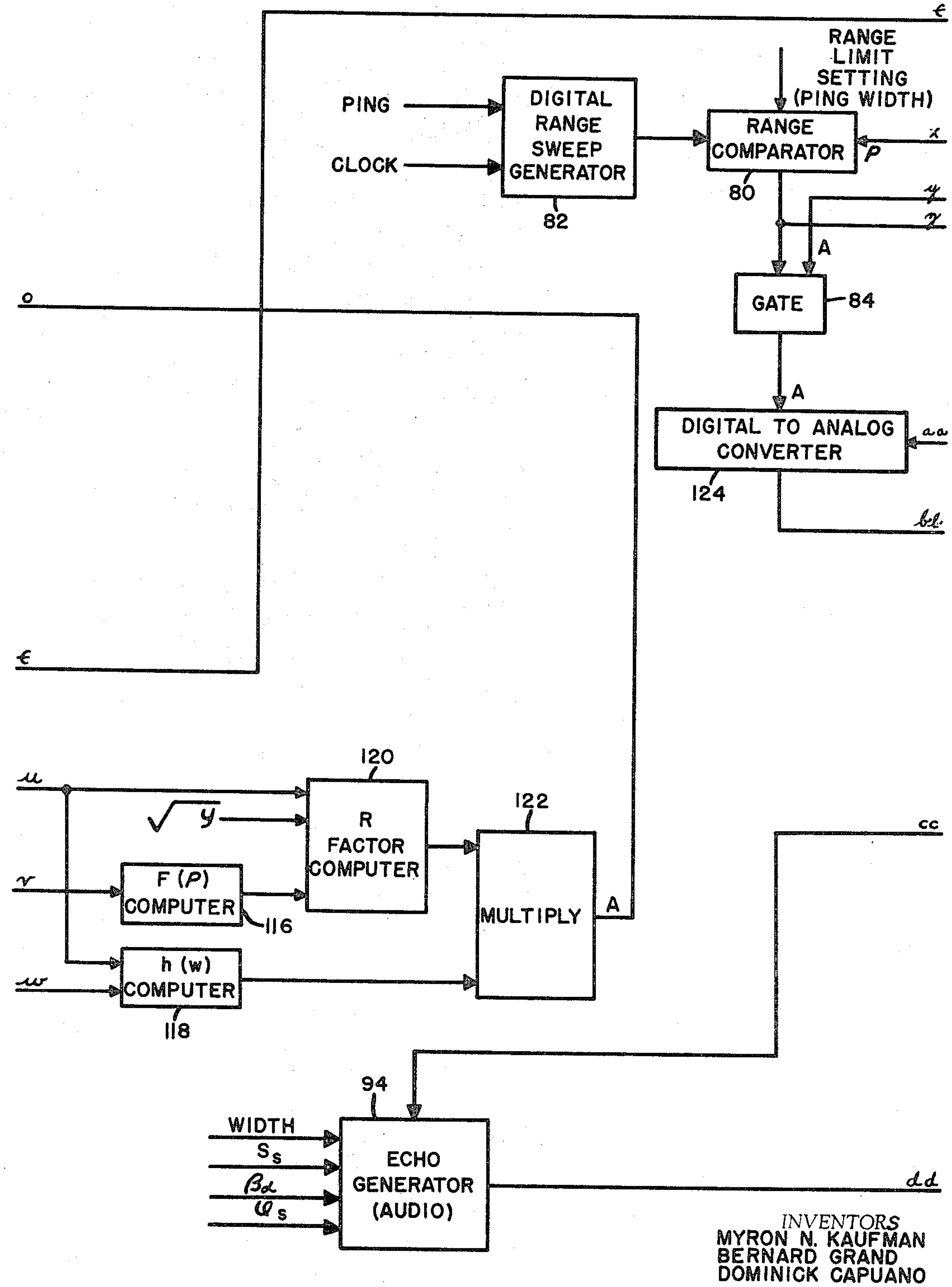
Figure 1F:
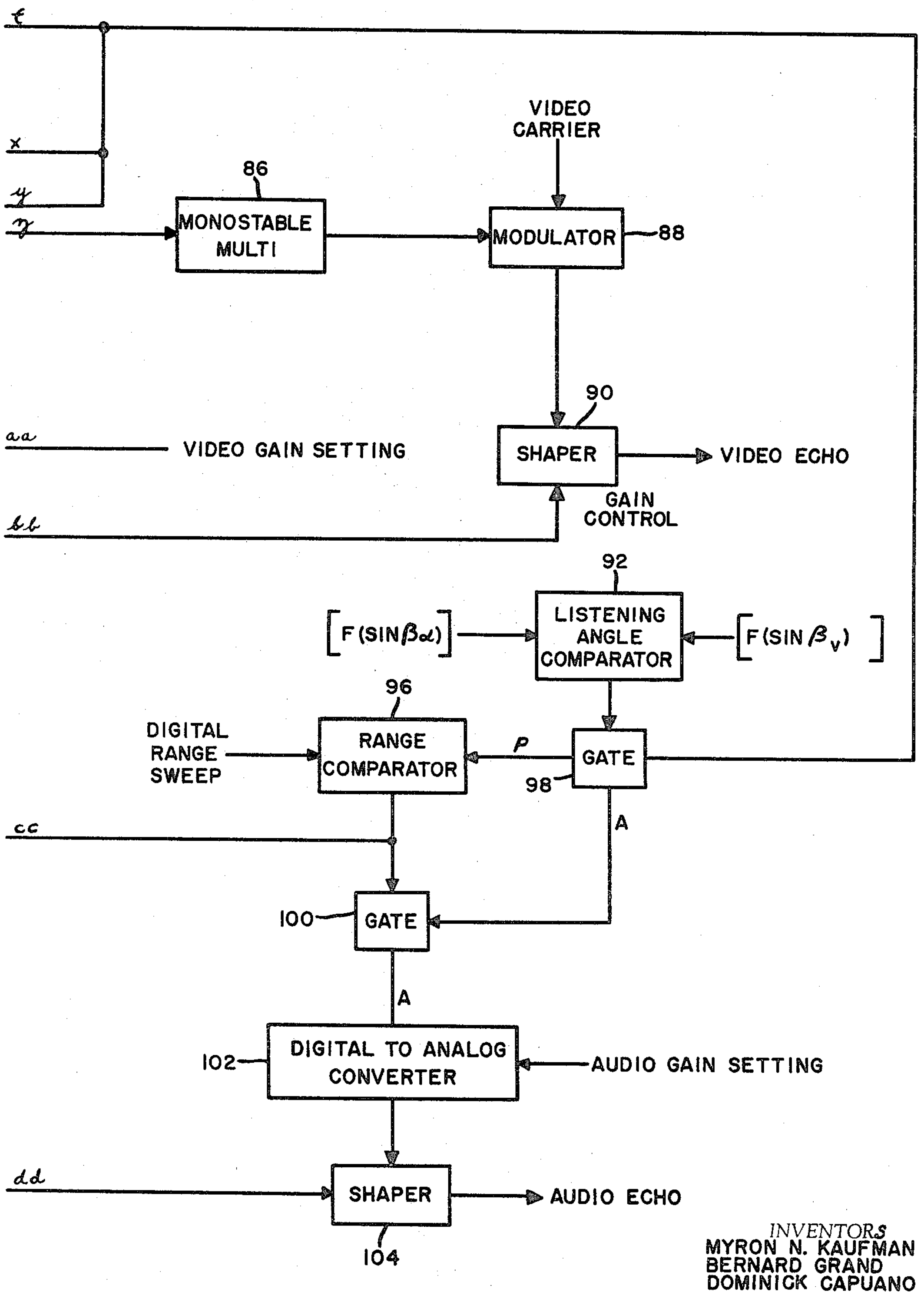

Previously utilized wake simulators were determined on the basis that the sonar transmitter remain stationary during the problem. This permitted information to be stored relative to the fixed sonar reference. The previously used fixed sonar reference non-scanning type sonars had the following limitations: no provision for change of relative position; very limited accuracy; limited to a non-scanning type sonar; and the number of crossovers was limited by the amount of circuitry. The present invention overcomes these previous difficulties which limited sonar wake simulation to an unrealistic simulator capable only of simulating a limited number of wake echoes relative to a fixed sonar device for a non-scanning type sonar, by providing a wake simulator capable of simulating wake echoes for a long period of time for a scanning type of sonar which is moving relative to the position of the wake.

Referring now to FIGS. 1*a*–1*f*, the target speed, own ship speed, heading and absolute X and Y positions are generated as shaft positions. These parameters are utilized for generating the target velocity in the X and Y direction, the sine and cosine of the heading angle, a function $F(S_T)$ of the speed analog voltages representing X and Y positions. Generation of these signals is performed in the analog target input generator 10. Similar signals are generated in analog form in the analog sonar input generator 12 for the own ship position and X and Y components in the X and Y directions. Signal outputs from 10 and 12 are converted to digital form by the analog to digital converter 14. They are integrated by digital integrator 16 (to establish the dynamic ship position) digitally. The target position is sampled by sampler 18, periodically, and the sample stored as a digital number in a magnetostrictive delay line 20 and 22.

All of the timing including the sampling interval is controlled by the sample scan age timer 24. The extent of the area and the accuracy requirements are dependent on the type of sonars. Problems required will determine the number of bits stored. The information is stored in five delay lines, respectively 20, 22, 26, 28 and 30. Each of these delay lines has sufficient capacity to store information equivalent to fifteen minutes of track which is adequate considering that age modulation of the wake effect is approximately minus 6 db per minute. Samples are converted to relative information (relative to own ship) by means of the three second sampler 18, the delay lines 20, 22, 26, 28 and 30 and the eight millisecond sample and hold 32. This relative rectangular coordinate information is converted into polar coordinate information by means of adding circuits 34 and 36, multiplying circuits 38 and 40, adder circuit 42, square root circuit 44, divide circuit 46, subtract circuit 48, adder circuit 50, divide circuit 52, multiplier circuit 54, divide circuit 56 and by F sine $\theta$ generator 58. This polar coordinate information is stored in the intermediate delay line storage comprising delay lines 60, 62, 64 and 66. The information stored in the first and intermediate delay lines is time sequenced so it is not necessary to store age information, the age being implicit in the position of the stored bits. The position of the information as stored is kept track of by providing a digital sweep corresponding to the age generated in synchronism with the latest piece of information stored in the delay line. This digital sweep is shown as 68 and consists of generating a current age function which is precessed one slot of the delay line storage, each time new information is written.

Because the target is moving and the samples are discrete, there is need for spreading the information in order to generate a continuous track. The amount of spreading required is related to the range of the track; i.e., consider a close range for a slow target speed where the angular change in position for a fixed sampling interval may be large, and as a result, the spreading angle must be taken inversely proportional to the range. This spreading is accomplished by the eight millisecond sample and and hold circuitry 70.

Only the sine and cosine of the bearing angle are available, therefore bearing comparisons are accomplished by comparing the sine of the sonar scanning angle with the sine of the bearing angle in the bearing comparator 72. The nature of the sine function requires for the same angular accuracy, greater accuracy (more bits) for large angles, if this comparison is made on a straight sine-sine basis. Consequently, the information that is stored for comparison purposes is either a sine or a cosine depending upon the amplitude of this angle. For example, between zero and 45° the sine of the bearing angle is stored, for the bearing angle between 45° and 90°, the cosine is stored. This technique results in a relatively linear relationship between the trigonometric functions and the angle, and the problem of comparing sine to sine at 90° or sine to cosine at around 0° does not exist.

An intermediate set of delay lines 60, 62, 64 and 66 is used for storing the information derived at the first computation section. The information on the intermediate line is still stored in time sequence (based on the equations describing the absorption or reflecting characteristics of the wake). This is based on the age and the velocity of the target. Computations are performed in a digital computer for assessing the attenuation and function of each of the pieces stored in the intermediate storage.

An attenuation function A can be expressed in simple form as:

$$A=\underbrace{\frac{\sin \alpha}{F(S_T)F_1(T)}}_{\text{Interspersed Wake}}\cdot\underbrace{\frac{F_2(T)}{F(p)}}_{\text{Reflecting Wake}}$$

where $F(S_T)$ is a function of the target speed while laying the interspersed wake;

$F_1(T)$ is a function of the wake segment age between the reflecting wake and sonar;

$F_2(T)$ is a function of the age of the reflecting wake; and $\alpha$ is the target aspect (bearing angle $\theta$—heading angle ($\phi$)).

The attenuation information is stored in the delay line together with the bearing information for that particular piece. The bearing information is next compared as shown on the block diagram to the sonar scanning angle which is generated by the sine generator 74, comparison being made in bearing comparator 72. When the coincidence is made, the attenuation function A and the range information are gated by gate 76 to the last storage delay line 78 called the display delay line. Information out of this last storage goes to range comparator 80 where it is compared to a digital range sweep generator 82. Generation of a pulse out of the range comparator opens gate 84 and passes through the attenuation factor A. At the same time, a monostable multivibrator 86 is triggered and the output is passed through a modulator 88 and a shaping network 90. The output of this shaping network 90 is a video-type echo the amplitude of which is controlled by the A function as indicated. The video echo may be modulated with the carrier or passed directly to the video section of the display and represents the final video output of the scanning type wake simulator. The audio input into the sonar is generated in a similar way except that the comparison is made between the information stored and the manually selected azimuth position of the audio scan section of the sonar. The resultant signals may be modified by Doppler shift into the audio channels contributed by the own ship listening angle comparator 92 relative to its heading angle and speed. Wake echoes can be further modified by the effects of sea state conditions, etc.

The audio section comprises audio echo generator 94, range comparator 96, gate 98, gate 100, digital-to-analog converter 102 and shaper 104. A synchronous circulating display storage comprising bearing comparator 72, gate 76, sample and hold circuitry 70, display storage 78, greater-than-range comparator 106, bearing limiter comparator 108, continuous circuitry 110, 112, and 114, $F_T$ computer 116, $H_W$ computer 118, the R factor computer 120 and multiplication block 122 which provides the attenuation factor to recirculate back into the timing circuitry is the key to the simulation of wake effects for high speed scanning sonar where both the sonar and targets may have motion. Because the information in the video storage is arranged in synchronism with the video scan only two numbers for each wake segment are stored. The display storage is divided into 48 sections, one for each beam width (7.5° for the particular sonar of interest). Each section may contain several roll and attenuation numbers to accommodate power of the tracks that cross back and forth from the same 7.5° sector. The range data is compared to a range sweep initiated by the sonar ping 74. When a comparison is made in the range comparator 80 the wake segment attenuation corresponding to that wake range is converted to an analog voltage by digital-to-analog converter 124 which is used to modulate a suitable carrier. This signal is routed to the video amplifiers where due to the synchronism between the display storage and the PPI, it is displayed at the correct angular position. In this fashion each segment of the wake is displayed in a fast succession so that a continuous wake pattern of any track laid is presented in realistic fashion. Thus, it can be seen that with the use of a minimum number of components and non-complex circuitry realistic simulation of wake echoes can be made for scanning type sonars where the wake generator and the scanning sonar ship have relative motion between each other.

In order to add more realism certain effects are added to the wake simulation. These comprise propeller noise simulation for simulation of shaped random cavitation noise, inclusion of coherent machinery noise with cavitation noise, the effect of outphasing caused by multiple propagation paths and propeller beat modulation dependent upon the target speed. Propeller modulation generation will be provided. Reverberation generation will be provided and sea state and random noise generation will be provided.

Figure 2:
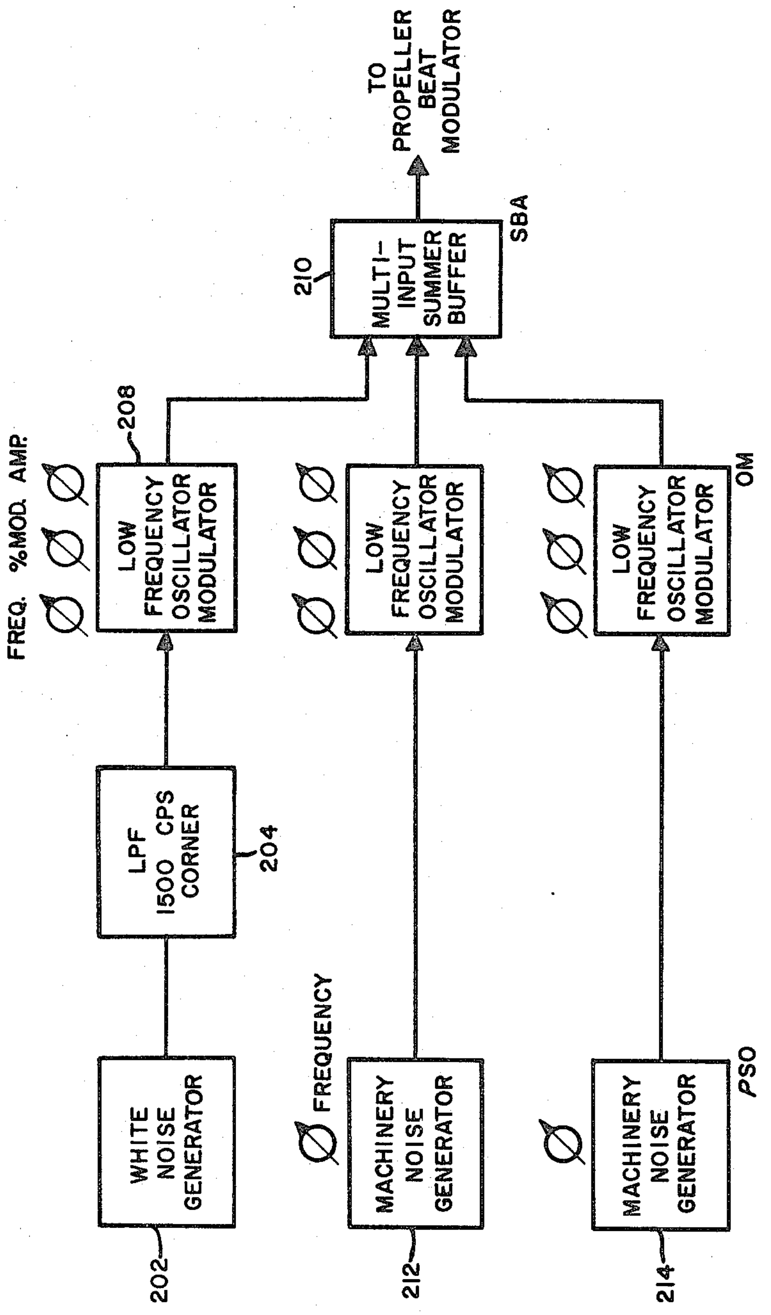
FIG. 2 is a block diagram of the cavitation and coherent propeller noise generator.

FIG. 2 is a block diagram of the cavitation of coherent propeller noise generation. The source of cavitation noises is a broad-band noise generator 202. The random noise generator uses a gas discharge tube as a noise source. A transverse magnetic field is applied to the tube to eliminate the oscillation usually associated with a gas discharge tube and to increase the noise level at high frequencies. The noise output from the gas tube is amplified in a two-stage amplifier for appropriate spectrum shaping. The noise has a normal gaussian distribution. The wide noise generator is followed by a filter 204 which provides a realistic random noise spectrum. The filter is followed by a low frequency oscillator modulator 206. The low frequency oscillator tube can be varied continuously from .25 to 10 cycles per second. The low frequency generator is utilized to amplitude modulate the filtered noise channel. Percentage modulation is adjustable from nominally zero to 100% and the modulated signal is adjustable in amplitude. The oscillator modulator output is routed to a multi-input summer buffer 210 which includes the effect of multiple propagation paths. Two machinery or coherent noise generators 212 and 214 are supplied as indicated in the diagram. Machine noises are continuously variable in frequency from 150 to 15,000 cycles per second. Each of the noise generator outputs is routed to a low frequency oscillator with the output of the modulator routed to the multi-input summer buffer. The machinery noise generator is intended to simulate the effect of engine machinery, auxiliary machinery, propeller singing and vibrating members on the hull.

Figure 3:
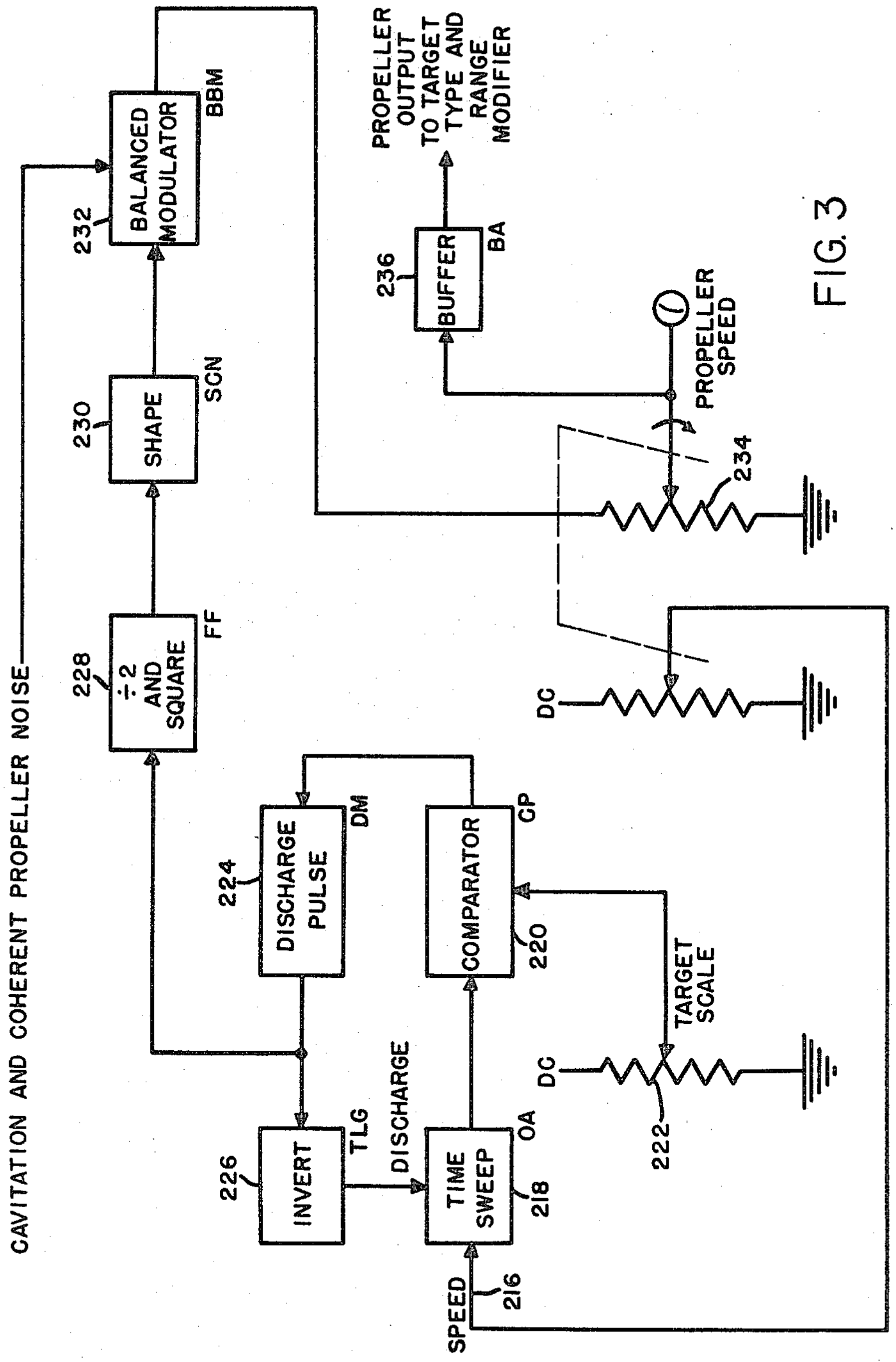
FIG. 3 is a block diagram of the propeller modulation for a single propeller.
Figure 4:
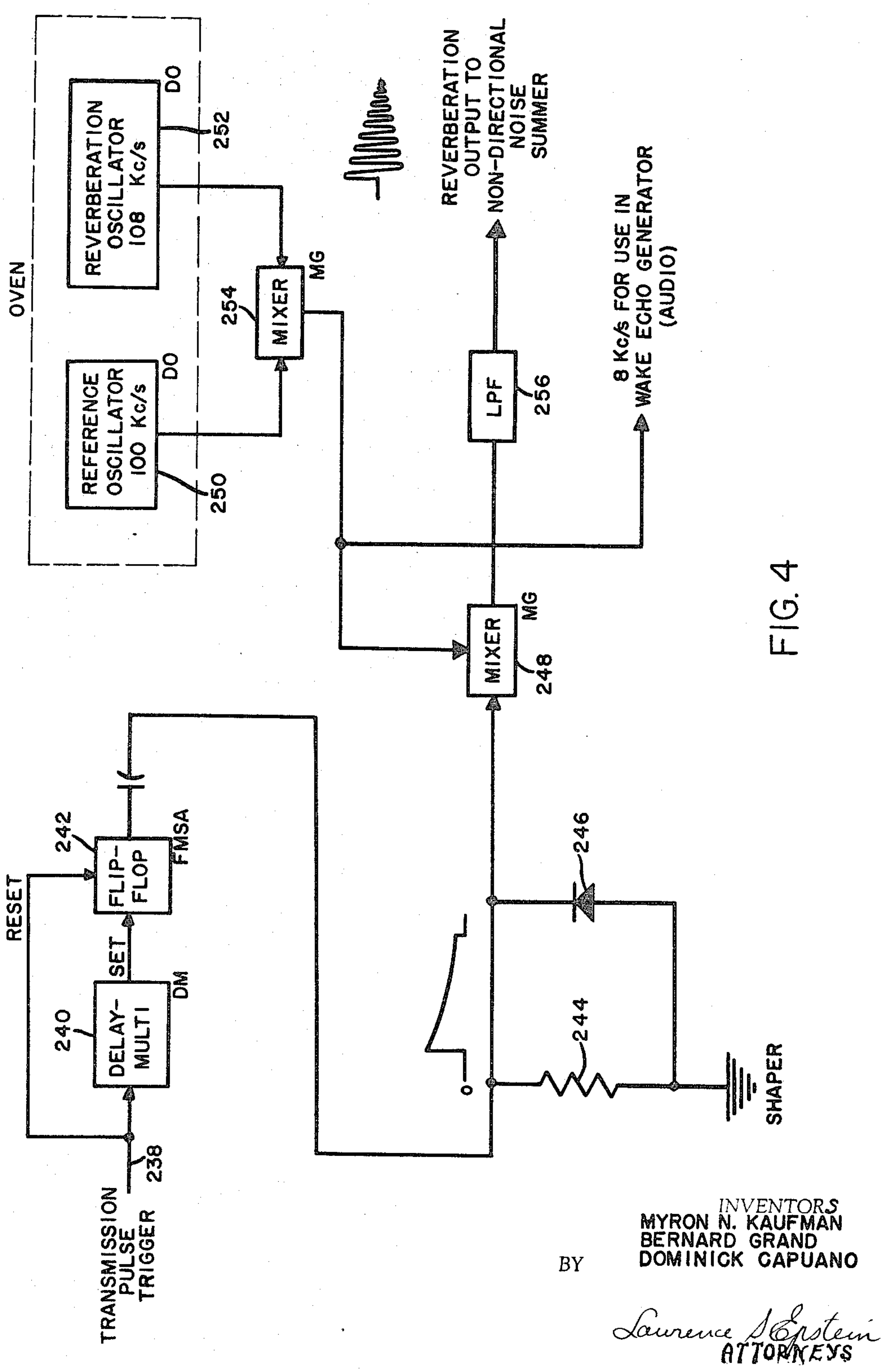
FIG. 4 is a block diagram of the reverberation generation simulator.
Figure 5:
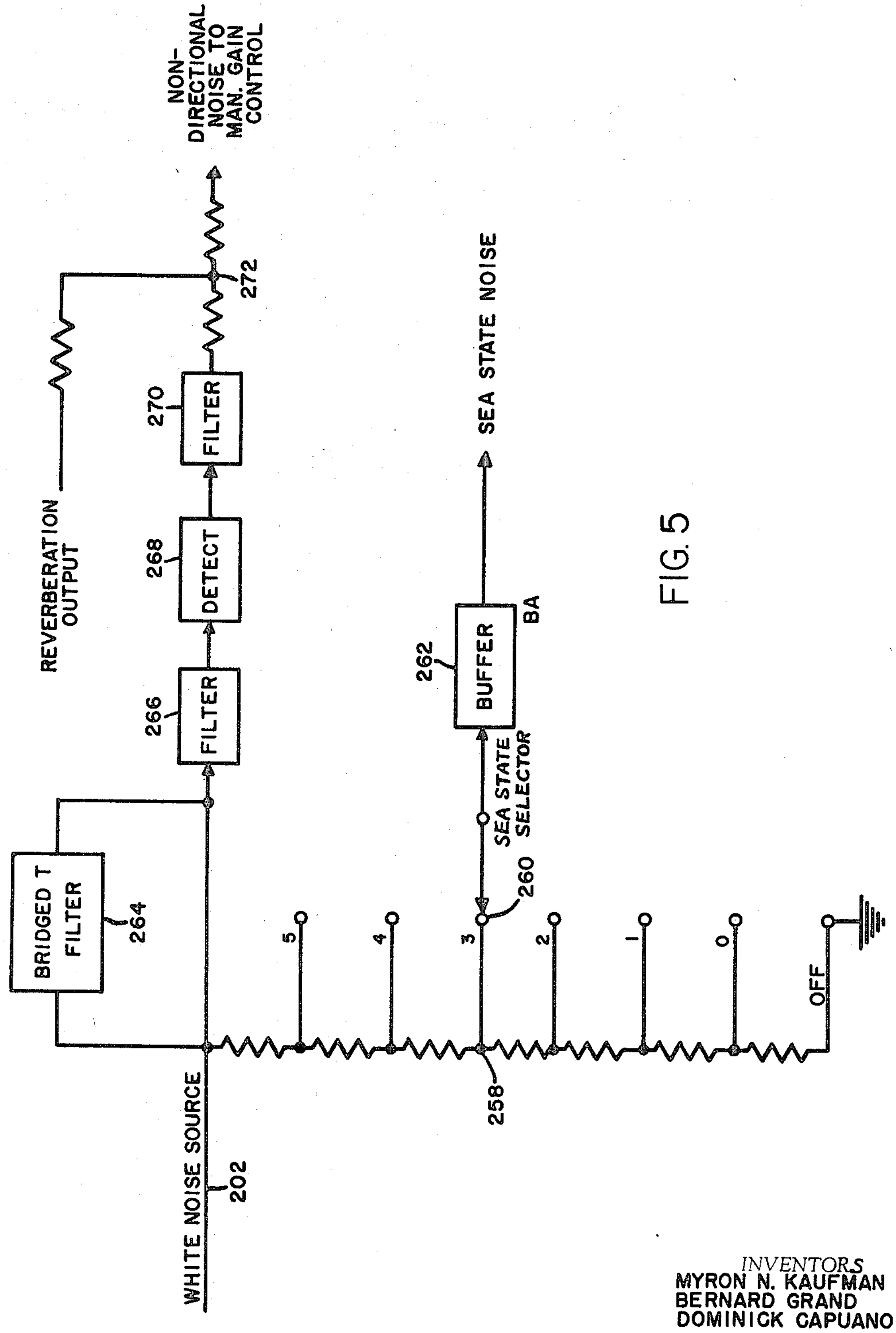
FIG. 5 is a block diagram of the sea state and random noise simulator.

FIG. 3 is a block diagram of the propeller modulation generator. The purpose is to generate a shaped envelope used to modulate the cavitation and coherent noises described above. The repetition rate of the modulation will be determined by the target speed and the target scale. These signals, target speed and target scale, are manual inputs. DC speed signal 216 is inserted into the input of an operational integrator which generates a sweep voltage 218. This voltage is determined by the target speed. This sweep is passed to a comparator circuit 220 which utilizes as reference signals target scale 222. When the sweep and reference signals are equal, the comparator generates a trigger which turns on a fixed width delay multi-discharge pulse 224. This pulse is passed to a buffer inverter 226 and is used to discharge the capacitor of the operational integrator after which the whole process is repeated. The rate of the delay multi-pulses are consequently proportional to the speed when related to the target scale. The delay multi-pulses are routed to a flip-flop 228, the output of which is square wave at half the frequency of the discharge pulse. The flip-flop output is routed to a shaper network 230 which shapes the square wave to the required propeller modulation envelope. This shaped signal is routed to a balanced bridge modulator 232 where it modulates the cavitation and coherent propeller noise. The modulated propeller noise is routed to a potentiometer 234 which attenuates the propeller noise inversely proportional to the speed. The output of the speed modulation potentiometer 234 is routed to the audio and video channels to modulate the video echo and the audio echo signals for realistic simulation of propeller modulation noise. In order to simulate reverberation on the video and audio signals, a reverberation generator shown in FIG. 4 is utilized. The transmitted pulse 238 transmitted by the sonar initiates reverberation signal. The trigger is utilized to set a short delay multi 240 which has a time constant of approximately 50 microseconds and at the same time it resets flip-flop 242. At the end of the delay multi interval, the flip-flop is set, and the output of the flip-flop signal is differentiated in the shaper 244 wherein diode 246 prevents negative undershoots. The resulting exponentially falling wave form is passed to a multiplexer 248 where it is mixed with an 8,000 cycle signal. The 8,000 cycle CW signal is generated by mixing the outputs from a 100 kc. and a 108 kc. oscillator, respectively 250 and 252. It should be noted that both oscillators are situated in a common oven so that the frequency of the reverberation is stable. Since it is important that the frequency of the target echo with respect to reverberation frequency be consistent, it will be necessary to include the target echo oscillator in the same common oven. The 100 kc. and 108 kc. signals are mixed in mixer 254 producing an 8 kc. signal which is mixed with the exponentially falling wave form. The output from the mixer 248 is passed through low-pass filter 256. This filter 256 has a cutoff at approximately 8,000 cycles to eliminate the harmonics generated in the mixing process. Note that 8,000 cycles is utilized here which coincides with the frequency of the sonar used. The own ship Doppler nullifier provision in the sonar set which is provided because of the static or stationary condition of the wake, makes it unnecessary to have any wake Doppler signal generated. Consequently, the 8 kc. signal generated in the reverberation carrier is utilized for generating the wake audio echoes. Reverberation output is routed to the non-directional noise summer where it is combined with the sea state noise to modify these simulated signals.

*Sea state and random noise*

The wide noise generator 202 is also used as a source of the sea state low frequency random noise. As shown in the figure, the broad-band wide noise source is routed to a resistor attenuator 258 which is utilized to supply broad-band noise to a manual sea state selector control 260. Six sea states from zero to five, are provided in this setup. The output of the sea state selector switch 260 is routed through a buffer 262, and is added into the video and audio displays for realistic background noise condition.

All of the target and wake noises are subject to low frequency random modulations due to the multiple propagation paths. Consequently, a very low frequency random noise is desired for simulating this effect by modulating the wake and target echoes generated. The frequency of the random noise will extend from DC to approximately 10 p.p.s. The source of noise utilized does not have very low frequency random noise components. Consequently, the circuitry shown comprising bridge T filter 264, filter 266, detector 268, filter 270 and the summing network 272 is utilized for generating random frequencies down to DC. A narrow band filter 266 is provided with a center frequency of 2,500 cycles per second. Consequently, the amplitude envelope of the 2,500 cycle signal generator is very slow. The envelope is detected by detector 268 and passed through a low-pass filter 270. The resulting output is low frequency noise of the type described. This low frequency noise will subsequently be used to modulate the video and audio signals generated to simulate the multi-propagation paths. The operation of the circulating display storage which provides proper video signals for a sonar display is as follows.

The digital memory has an access time of nominally 8 milliseconds in the preferred embodiment, which is equivalent to the sonar PPI scan rate of 120 cycles. The display storage is divided into 48 slots, each corresponding to a 7.5° increment of target bearing angle. Within each 7.5° segment, capacity is provided for storing 7 samples of range ($p$) and attenuation factor (A) of a wake, which is enough to accommodate 7 target crossings at the same bearing. The eight-bit $p$ number quantizes the range to 60 yards. The attenuation, A, is held as a 14-bit word to provide greater than 80 db dynamic range. Two blank bit spaces are provided for each sample of $p$ and A by forming a basic 24-bit word length. Consequently, the display storage capacity is 7 words per slot times 48 slots times 24 bits per word equal 8,064 bits. At a 1.024 megacycle digital clock rate, the display storage recirculation time is 7,875 microseconds (equivalent to 127 cycles). To obtain synchronism between the PPI and display storage the motor that drives the 48 position sonar scanning switch and the sonar sweep generator is disconnected. A computer synchronized 127 cycles per seconds signal is used to drive the synchronous motor which together with the resolver and a ping synchronized ramp provides the sonar PPI scan.

Figure 6:
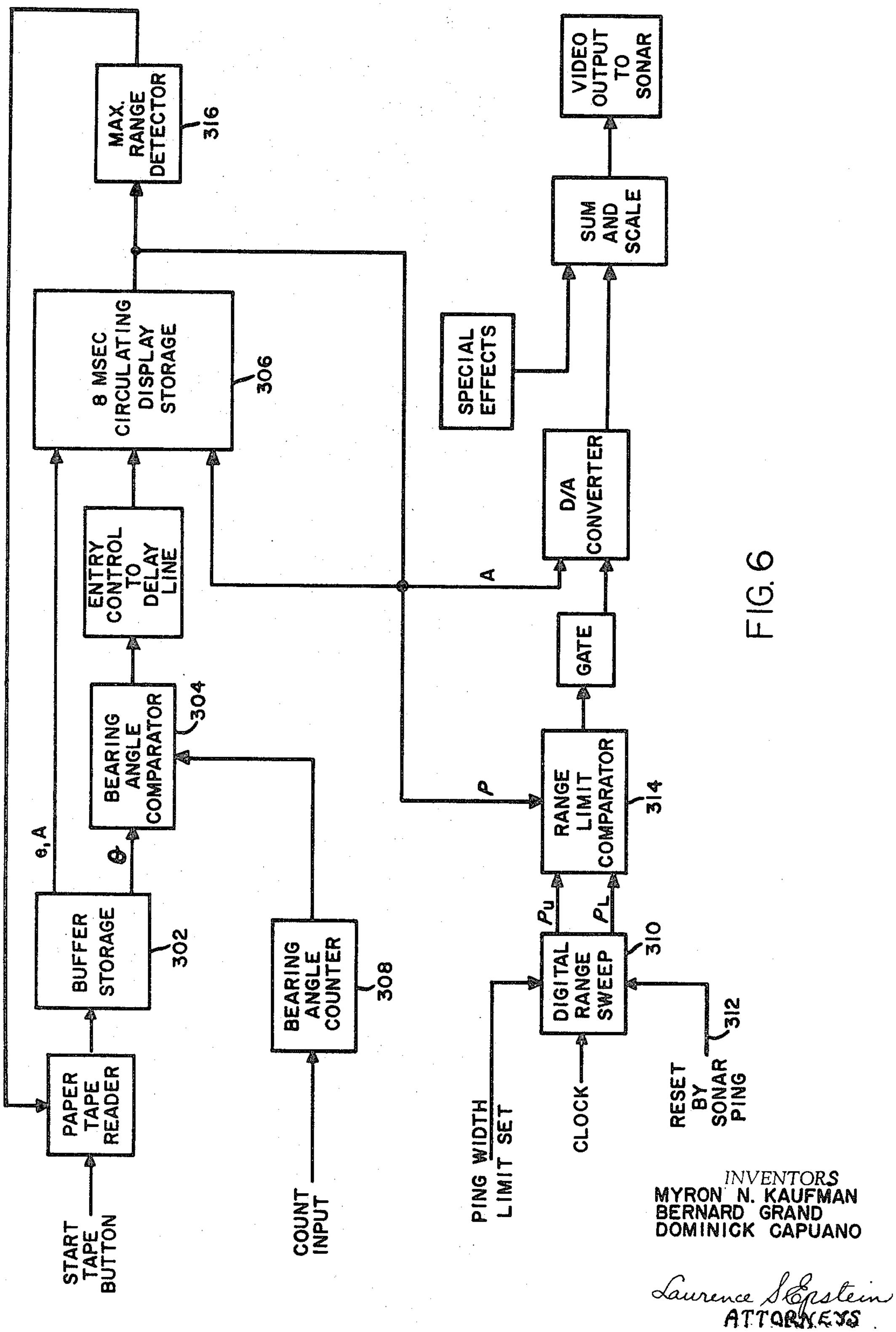
FIG. 6 is a detailed block diagram of the wake simulator display circuitry.

Referring to FIG. 6, the $p$, A and $\theta$ (bearing angle) information stored on paper tape is converted to serial digital numbers temporarily stored in the buffer storage 202. A bearing angle counter which counts from 1 to 48 is used to select any 7.5° slot. Every 168 mircoseconds (7.5°) the counter is stepped. The counter output is compared to the temporarily stored $\theta$ number in the bearing angle comparator 304. Display storage line 306 which contains the range and attenuation numbers is synchronized to the bearing angle counter 308. When the counter is in position 1 it is possible to place information that has a bearing angle between 0° and 7.5° into the display storage line. Information related to a bearing of 7.5° to 15° is entered into slot 2 (168 microseconds later) and so on until, when the counter has reached the 48th slot (8 milliseconds later), the 352.5° to 360° portion of the delay line is available.

The digital range sweep is initiated in digital range sweep unit 310 by the sonar ping 312 after which a step sweep is generated consisting of 8 millisecond steps each having a weight of 7.5 yards. The simulated ping width is added to each range step. The range plus the ping width digital number and the range number alone represents the upper and lower limits of each range step. Once the input information is entered into the display line, it is repeatedly compared to the simulated radial sweep. When a segment of the wake is found to have a range line between the upper and lower limits of the ping, the gate is activated by the range limit comparator 314 and the A number is routed to the display storage 306. This attenuation number which defines the necessary intensity of the video is converted to an appropriate analog signal and is summed and scaled with special effects as described previously.

After all the numbers in the display storage line are scanned, compared and displayed, the maximum range number is detected by maximum range detector 316. At this time all the information in the delay line has been displayed and a total wake presentation viewed. When the maximum range detection is accomplished the old information in the delay line is erased and the tape reader updates the line with the latest wake information. This process of read-in, scanning, displaying and reading-in again is repeated every 20.5 seconds (time between pings) for fifteen minutes. The new information is a continuation of the previous information but contains data for an additional 20.5 seconds of movement and aging. In this way, a real time display of the wake is generated.

Obviously many modifications and variations of the present invention are possible in the light of the above teachings. It is therefore to be understood that within the scope of the appended claims the invention may be practiced otherwise than as specifically described.

What is claimed is:

1. A simulator device for simulating the wakes of ships on sonar equipment comprising in combination, means for generating target speed, target heading and target position, means for generating own ship speed, own ship heading and own ship position, first digital converter means, said first digital converter means being connected to said target speed, target heading and target position generating means, for conversion of said target speed, target heading and target position signals to digital form, second digital converter means, said second digital converter means being operatively connected to said own ship speed, own ship heading and own ship position generating means for conversion of said own ship speed, own ship heading and own ship position signals to digital form, integration means, said integration means being operatively connected to said first and second digital conversion means for integration of said digital signals to produce dynamic ship position signals in digital form, sampling means, said sampling means being operatively connected to said target position generating means, signal storage means, said signal storage means being operatively connected to said sampling means whereby said target position signals are periodically sampled and stored in said storage means as a digital number, timing control means, said timing control means being operatively connected to said sampling means for control thereof, conversion means, said conversion means being operatively connected to said timing means and to said sampling means for converting said sampling information into relative rectangular coordinate information and polar coordinate information, intermediate storage means, said intermediate storage means being operatively connected to said converter means for storage of said relative rectangular coordinate and polar coordinate information, digital sweep means, said digital sweep means being operatively connected to said timing means, to said first storage means and to said intermediate storage means for position control of said stored information in accordance with age, spreading means, said spreading means being operatively connected to said intermediate storage means for spreading the discrete signals stored into a continuous track, attenuation function generating means, said attenuation function generating means being operatively connected to said intermediate storage means, said attenuation function generating means generating signals representative of the attenuation of each sample of information stored in said intermediate storage means, bearing comparator means, said bearing comparator means being operatively connected to said intermediate storage means for comparing bearing information stored to sonar scanning angle, gating means, said gating means being operatively connected to said intermediate storage means for gating of the attenuation function information and the range information whereby whenever coincidence between bearing information and sonar scanning angle is made, the attenuation function signal and the range information are gated to a third signal storage means, range comparator means, said range comparator means being operatively connected to said signal storage means for comparison of said stored range signals and an input digital range sweep signal, and gate means, said gate means being operatively connected to the output of said range comparator means whereby coincidence of range comparator signals with digital range sweep signals generates a pulse which opens the gate and passes attenuation factor signals through as a video type echo signal whose amplitude is controlled by the attenuation function signals.

2. The combination of claim 1 wherein said first storage means, said intermediate second storage means and said third storage means each comprise a magnetostrictive delay line and a control circuit operatively connected thereto.

3. The combination of claim 2 and a shaping network, said shaping circuit being operatively connected to the output of said range comparator gate for shaping the video-type echo signal output in accordance with the attenuation function.

4. The combination of claim 3 and sea state condition generating means and signal modulation means, said signal modulation means being operatively connected to said video-type echo output signals and to said sea state condition generating means whereby said sea state condition generating means generates signals which modulate said video-type echo output signals in accordance with sea state conditions.

5. The combination of claim 4 and means for generating simulated audio signals.

6. The combination of claim 5 wherein said means for generating audio signals comprises circuitry identical to that of the video echo signal generating means.

7. The combination of claim 6 and Doppler shift generating means and signal modulation means, said signal modulation means being operatively connected to said Doppler shift generating means and to said audio signal echo generation means whereby said Doppler shift generation means generates signals for modulating said audio signal in simulation of Doppler shifting of signals.

8. The combination of claim 7 wherein said sea state condition generating means comprises, means for generating propeller noise simulation, means for generating propeller modulation generation, and means for generating reverberation generation, said propeller noise simulation means comprising, a white noise generator means, a low-pass filter means, said low-pass filter means being operatively connected to said white noise generator means for filtering of said noise signal, oscillator modulator means, said oscillator modulator means being operatively connected to said low-pass filter means whereby said noise signals generated provide signals for modulation of the video-type echoes.

9. The combination of claim 8 wherein said propeller modulation generation circuits comprise, time sweep generation circuits, said time sweep generation circuits being controlled by input speed signals, comparator means, said comparator means being operatively connected to said time sweep generation circuits for comparing said time sweep with said target scale signals, discharge pulse means, said discharge pulse means being operatively connected to said comparator means for control thereby, said time sweep generation circuits, said comparator means and said discharge pulse means forming an integrator which generates a sweep voltage level which is dependent on the target speed, frequency dividing and shaping circuitry, said frequency dividing and shaping circuitry being operatively connected to the output of said integrator for frequency division and shaping of the integrated pulses, modulator means, said modulator means being operatively connected to the output of said frequency division and shaping circuitry for modulating said target sweep pulses which modulates the propeller noise signals in accordance with said shaped pulses, and inverse potentiometer means, said inverse potentiometer means being operatively connected to the output of said balanced modulator for attenuating propeller noise inversely proportional to the propeller speed, the output from said propeller speed input shaft potentiometer means being operatively connected to said video echo signals simulated, whereby said simulated video echo signals are modulated in accordance with the simulated propeller noise.

No references cited.

MALCOLM A. MORRISON, *Primary Examiner.*

J. RUGGIERO, *Assistant Examiner.*